United States Patent
Pfeifer et al.

(10) Patent No.: US 11,441,480 B2
(45) Date of Patent: Sep. 13, 2022

(54) METHOD FOR OPERATING AN INTERNAL COMBUSTION ENGINE, CONTROL DEVICE, AND INTERNAL COMBUSTION ENGINE

(71) Applicant: MTU FRIEDRICHSHAFEN GMBH, Friedrichshafen (DE)

(72) Inventors: Rolf Pfeifer, Uhldingen-Mühlhofen (DE); Ion Madan, Tettnang (DE); Vadzim Khakholka, Friedrichshafen (DE); Dietmar Ackermann, Langenargen (DE); Patrick Stoeckle, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/976,221

(22) PCT Filed: Feb. 27, 2019

(86) PCT No.: PCT/EP2019/054892
§ 371 (c)(1),
(2) Date: Aug. 27, 2020

(87) PCT Pub. No.: WO2019/166506
PCT Pub. Date: Sep. 6, 2019

(65) Prior Publication Data
US 2021/0003071 A1    Jan. 7, 2021

(30) Foreign Application Priority Data
Mar. 1, 2018  (DE) .................... 10 2018 104 661.8

(51) Int. Cl.
*F02B 77/08*  (2006.01)
*F01M 11/10*  (2006.01)
(Continued)

(52) U.S. Cl.
CPC .......... *F02B 77/083* (2013.01); *F01M 11/10* (2013.01); *F02B 77/082* (2013.01);
(Continued)

(58) Field of Classification Search
CPC ...... F02B 77/083; F02B 77/085; F02D 41/22; G01M 13/00; G01M 13/04; G01M 15/05;
(Continued)

(56) References Cited

U.S. PATENT DOCUMENTS

2014/0379199 A1* 12/2014 Schulz ............... G05B 23/0283
701/29.2

FOREIGN PATENT DOCUMENTS

EP            2705221 B1 *  8/2018  ......... G05B 23/0283

* cited by examiner

*Primary Examiner* — Manuel L Barbee
(74) *Attorney, Agent, or Firm* — Lucas & Mercanti, LLP; Klaus P. Stoffel

(57) ABSTRACT

A method for operating an internal combustion engine with a motor, having a moving machine part and at least one machine element which retains the moving machine part and is subject to wear, such as, for example, a supporting, sealing, guiding or the like retaining machine element that is subject to wear during operation relative to the moving machine part, which machine element, because of the wear, is service-life-limiting for the operation of the internal combustion engine, wherein—for the operation of the internal combustion engine, a service-life-limiting time interval until the next maintenance of the internal combustion engine is specified, and—the internal combustion engine has a number of service-life-limiting machine elements, wherein for the at least one service-life-limiting machine element a remaining service life is forecast and the service-life-limiting time interval is determined therefrom.

28 Claims, 8 Drawing Sheets

(51) Int. Cl.
    *F02D 41/22*     (2006.01)
    *F16J 9/12*     (2006.01)
    *G01M 13/00*     (2019.01)
    *G01M 13/026*     (2019.01)
    *G01M 13/04*     (2019.01)
    *G01M 15/05*     (2006.01)
    *G05B 23/02*     (2006.01)
    *G07C 5/00*     (2006.01)

(52) U.S. Cl.
    CPC ............ *F02B 77/085* (2013.01); *F02D 41/22* (2013.01); *F16J 9/12* (2013.01); *G01M 13/00* (2013.01); *G01M 13/026* (2013.01); *G01M 13/04* (2013.01); *G01M 15/05* (2013.01); *G05B 23/024* (2013.01); *G05B 23/0283* (2013.01); *G07C 5/006* (2013.01); *F01M 2011/14* (2013.01); *F02D 2200/024* (2013.01)

(58) Field of Classification Search
    CPC ....................... G01M 23/024; G01M 23/0283; G07C 5/006; F01M 2011/14
    See application file for complete search history.

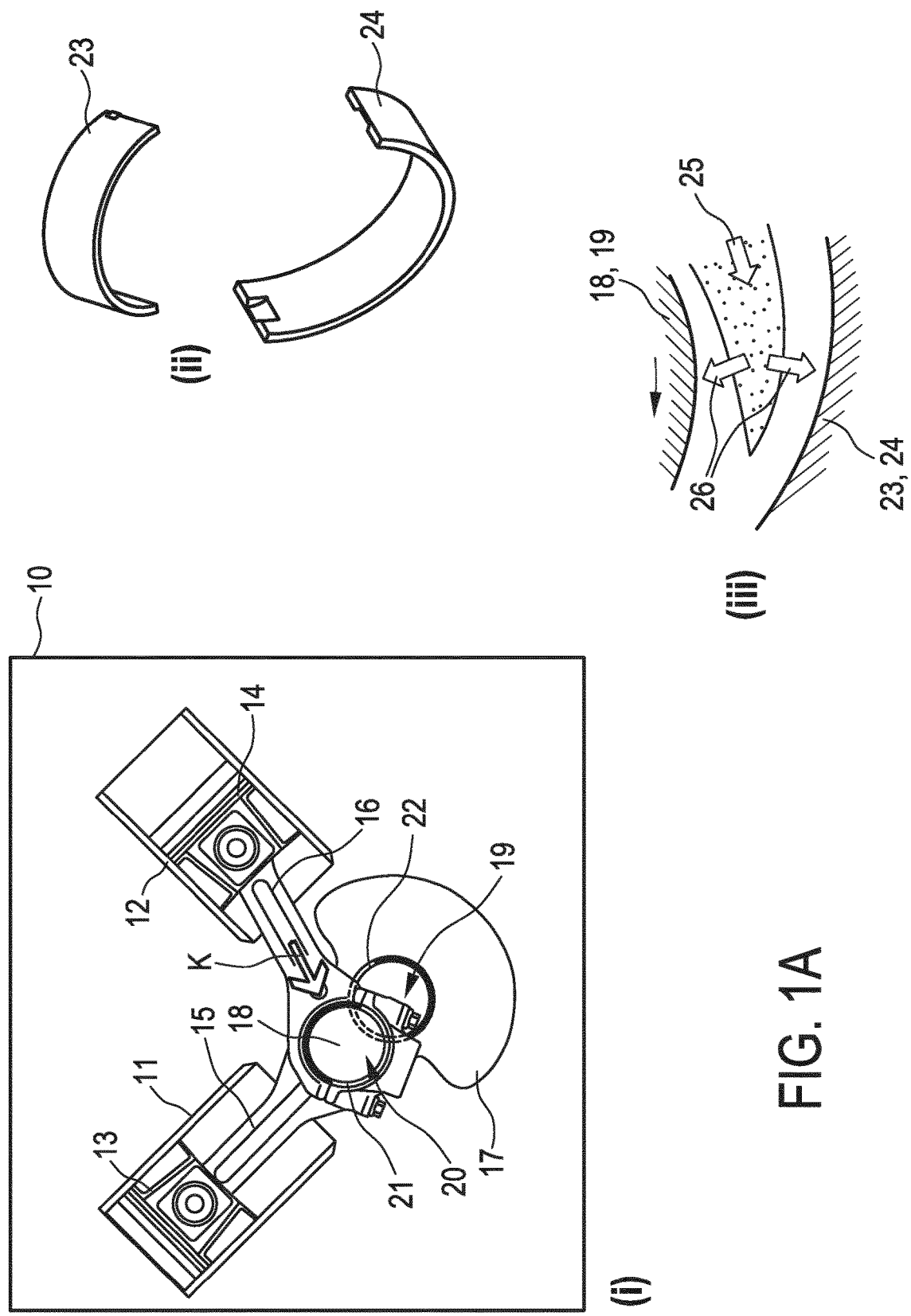

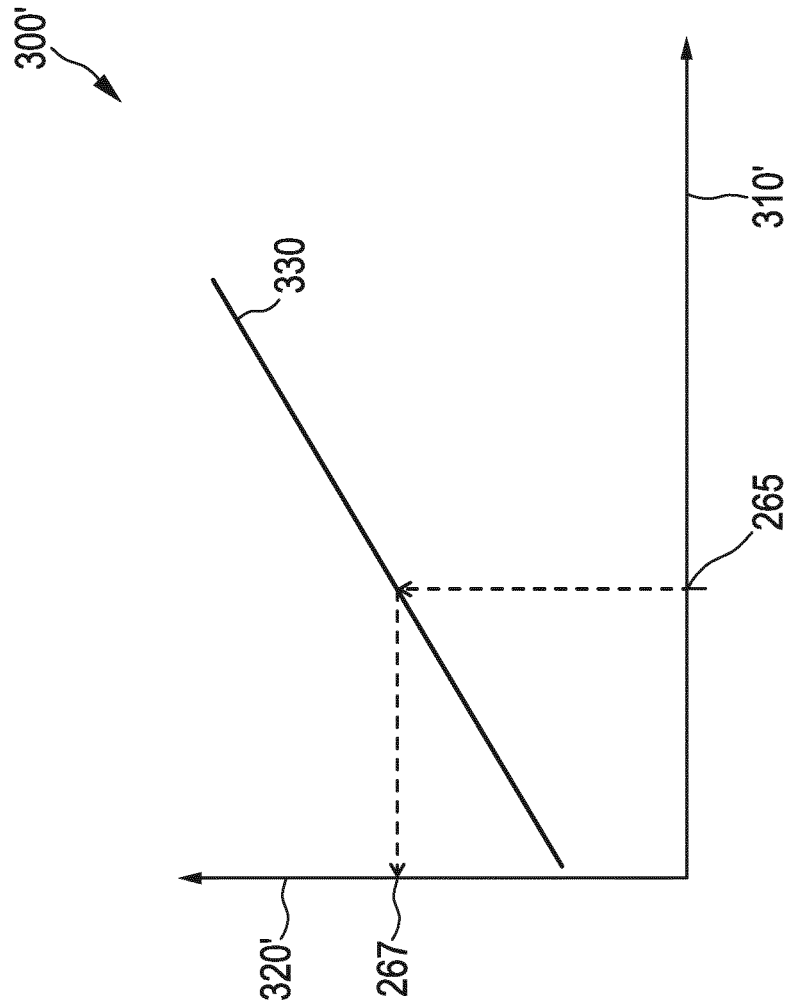

METHOD FOR OPERATING AN INTERNAL COMBUSTION ENGINE, CONTROL DEVICE, AND INTERNAL COMBUSTION ENGINE

CROSS-REFERENCE TO RELATED APPLICATIONS

The present application is a 371 of International application PCT/EP2019/054892, filed Feb. 27, 2019, which claims priority of DE 10 2018 104 661.8, filed Mar. 1, 2018, the priority of these applications is hereby claimed, and these applications are incorporated herein by reference.

BACKGROUND OF THE INVENTION

The invention relates to a method for operating an internal combustion engine with a motor, comprising a movable engine part and at least one engine element which holds said movable engine part and which is subject to wear, such as for example an engine element which has a bearing, sealing, guiding or similar holding action and which wears relative to the movable engine part during operation and which, owing to the wear, has a service-life-limiting effect for the operation of the internal combustion engine, wherein for the operation of the internal combustion engine, a service-life-limiting time interval until a next maintenance operation on the internal combustion engine is specified, and the internal combustion engine comprises a number of service-life-limiting engine elements, wherein, for the at least one service-life-limiting engine element, a remaining service life is predicted and, from this, the service-life-limiting time interval is determined. The invention furthermore relates to a control device and an internal combustion engine.

An internal combustion engine has a multiplicity of movable engine parts, in particular for example rotating rod-like engine parts such as shafts or other engine parts which move in reciprocating fashion, such as pistons or the like. These movable engine parts are generally held relative to others; for example, a shaft in a bearing or a piston in a cylinder of the motor. A movable engine part is thus generally held relative to at least one engine element which holds said movable engine part and which is subject to wear, such as for example an engine element which has a bearing, sealing, guiding or similar holding action and which wears relative to the movable engine part and which has a service-life-limiting effect for the operation of the internal combustion engine.

It is basically possible from this, for the operation of the internal combustion engine, a service-life-limiting time interval until a next maintenance operation on the internal combustion engine is derived. The internal combustion engine may comprise a number of service-life-limiting engine elements, wherein, for the at least one service-life-limiting engine element, a remaining service life of the service-life-limiting engine element is predicted and, from this, the service-life-limiting time interval is determined.

For the calculation of a remaining service life of the service-life-limiting engine element of an internal combustion engine, a so-called Palmgren-Miner calculation method is known. In this method, a linear accumulation of damage for example to a bearing or seal or running element, which is relevant for the service life, of an internal combustion engine, specifically in this case in particular of the motor thereof, is assumed.

For example, a bearing, such as for example a connecting-rod bearing, a bearing of a camshaft or a bearing of a crankshaft of the internal combustion engine, or the bearing elements thereof, constitute(s) an above-stated engine element which is relevant for the remaining service life. For example, for the internal combustion engine, it is possible for a number of shaft rotations—for example crankshaft rotations of a crankshaft of the internal combustion engine—to be compared with a maximum number of shaft rotations which is based on empirical values and which is thus "realistically known" in order to thus estimate damage to the respective bearing element of the shaft. This approach is based on the hypothesis that basically every ignition is damaging to a relevant bearing element of the internal combustion engine, for example to an element of the connecting-rod bearing, of the bearing of a camshaft or of the main bearing of a crankshaft. On the basis of such a known calculation of the remaining service life of a relevant bearing element, it is possible to infer an appropriate time interval between engine overhaul operations for the internal combustion engine (TBO=Time Between Overhaul).

Such an engine overhaul operation is associated with great outlay. It typically requires a complete dismantling of the internal combustion engine—it is basically to be assumed that a corresponding vehicle or a corresponding plant to be operated using the internal combustion engine is nonoperational during such an overhaul.

It is therefore desirable, for TBO approval, to specify neither too low a value (which would give rise to unnecessary periods of nonoperation for the user of the internal combustion engine) nor too high a value (which would result in an increase in undesired failures of an internal combustion engine). In this respect, an above-stated approach has proven still to have room for improvement with regard to its reliability.

It has hitherto been sought to improve TBO approval in terms of its reliability by providing the value thus calculated with a multiplier which has been estimated from the field—that is to say using empirical values known from internal combustion engines in the field/in use. In this way, one has hitherto arrived at a service-life-limiting time interval which is more reliable, in the above sense, between engine overhaul operations. However, such an empirical optimization has also proven still to have room for improvement.

U.S. Pat. No. 6,285,947 B1 describes a method in which, at regular intervals, an amplitude of a power density spectrum for a measured indicator parameter in a marine drive system is determined and is compared with a previously stored reference power density spectrum of the indicator parameter in order to identify a possibly frequency-dependent deviation. On the basis of this, it is sought to predict a future state of the marine drive system or to predict an impending failure of or damage to or improper operation of a component; by way of example, the state of an injector is discussed. As indicator parameters, use is made for example of output values for an acceleration, a fuel pressure or an ignition system.

It has been found that, in the case of all previously known methods for determining a remaining service life of a service-life-limiting engine element of an internal combustion engine, the selection of potential influential parameters affecting a remaining service life—and thus also the determination of an appropriate time interval between engine overhaul operations—still has room for improvement.

Overall, it is desirable to specify an improved method for the in particular more reliable determination of an appropriate time interval between engine overhaul operations, in particular to specify an improved method for determining a remaining service life of a service-life-limiting engine element of the internal combustion engine. This however applies in particular not only to a relevant bearing component of the internal combustion engine, such as for example a connecting-rod bearing, a bearing of a camshaft or a main bearing of a crankshaft.

SUMMARY OF THE INVENTION

This is the starting point of the invention, the object of which is to specify a method which improves existing methods for determining an appropriate time interval between engine overhaul operations, and which thus in particular improves existing methods for operating an internal combustion engine, in particular more effectively, in particular more accurately and/or more reliably, estimates a degree of wear of an engine element which holds a movable engine part and which is subject to wear, such as for example an engine element of the internal combustion engine which has a bearing, sealing, guiding or similar holding action and which wears relative to the movable engine part.

The method according to the invention for the operation and maintenance of an internal combustion engine proceeds from a method for operating an internal combustion engine with a motor, comprising a movable engine part and at least one engine element which holds said movable engine part and which is subject to wear, such as for example an engine element which has a bearing, sealing, guiding or similar holding action and which wears relative to the movable engine part during operation and which, owing to the wear, has a service-life-limiting effect for the operation of the internal combustion engine, wherein for the operation of the internal combustion engine, a service-life-limiting time interval until a next maintenance operation on the internal combustion engine is specified, and the internal combustion engine comprises a number of service-life-limiting engine elements, wherein, for the at least one service-life-limiting engine element, a remaining service life is predicted and, from this, the service-life-limiting time interval is determined.

According to the invention, the method furthermore has the steps:

identifying at least one wear parameter (Y), which tribologically determines the remaining service life of the service-life-limiting engine element (262), for the wear of the engine element, assigning to a number (k) of usage conditions (225) of the internal combustion engine respective parameter values (X_k) which are operatively related to the wear (Y) of the service-life-limiting engine element, regressively determining a functional dependency between the number (k) of usage conditions (X), on the one hand, and the wear parameter (Y), on the other hand, wherein the regressive determination of the functional dependency is performed on the basis:

(i) of a predetermined operation of a number (n) of test internal combustion engines, comprising in each case one test engine element, wherein, in each case, the test engine element of a test internal combustion engine corresponds to the service-life-limiting engine element of the internal combustion engine and, during the predetermined operation, the usage conditions (X) of the test internal combustion engines are acquired, (ii) of a measurement of a test value of the wear parameter for the wear of the test engine element in each case on the test engine element of each of the number (n) of test internal combustion engines after the predetermined operation thereof, such that (iii) the functional dependency between the measured wear parameter (Y), on the one hand, and the acquired usage conditions (X), on the other hand, of the test internal combustion engines can be specified, calculating a value of the wear parameter for the service-life-limiting engine element of the internal combustion engine to be operated by means of the regressively determined functional dependency, and predicting a remaining service life of the service-life-limiting engine element, determining the service-life-limiting time interval of the internal combustion engine to be operated from the remaining service life of the service-life-limiting engine element.

The invention is based on the realization that the determination of an appropriate time interval between engine overhaul operations of the internal combustion engine can be reliably inferred from a state of the service-life-limiting engine element which holds at least one movable engine part and which is subject to wear. In the method according to the invention, a remaining service life of the internal combustion engine which is still to be maintained and operated is inferred from the operation of the multiplicity of test internal combustion engines. Here, through the use of a number (k) of usage conditions, in particular of at least two usage conditions, a functional dependency in relation to a wear parameter of the service-life-limiting engine element is particularly reliably calculated; specifically, according to the invention, is regressively calculated.

For this purpose, firstly, at least one wear parameter, which tribologically determines the remaining service life of the service-life-limiting engine element, for the wear of the engine element is determined. Then, a number (k) of usage conditions of the internal combustion engine are assigned respective parameter values (X_k) which are operatively related to the wear (Y) of the service-life-limiting engine element. Then, from this, a functional dependency between the number (k) of usage conditions (X), on the one hand, and the wear parameter (Y), on the other hand, is regressively determined.

The method according to the invention thus comprises method steps which relate to a number (n) of test internal combustion engines, specifically:

regressively determining a functional dependency between the number (k) of usage conditions (X) of the internal combustion engine, on the one hand, and the wear parameter (Y), on the other hand, wherein the regressive determination of the functional dependency is performed on the basis:

(i) of a predetermined operation of a number (n) of test internal combustion engines (210), comprising in each case one test engine element, wherein, in each case, the test engine element (220) of a test internal combustion engine corresponds to the service-life-limiting engine element (262) of the internal combustion engine and, during the predetermined operation, the usage conditions (X) of the test internal combustion engines are acquired, (ii) of a measurement of a test value of the wear parameter for the wear of the test engine element in each case on the test engine element of each of the number (n) of test internal combustion engines after the predetermined operation thereof, such that (iii) the functional dependency between the measured wear parameter (Y), on the one hand, and the acquired usage conditions (X), on the other hand, of the test internal combustion engines (210) can be specified.

The method according to the invention also comprises method steps by means of which the functional dependency obtained with the aid of the test internal combustion engines is utilized for the internal combustion engines to be operated, specifically:

calculating a value of the wear parameter for the service-life-limiting engine element of the internal combustion engine to be operated and maintained by means of the regressively determined functional dependency, and predicting a service life of the service-life-limiting engine element, determining the service-life-limiting time interval of the internal combustion engine to be operated and maintained from the remaining service life of the service-life-limiting engine element.

An advantage of the method according to the invention lies in the fact that the remaining service life of the internal combustion engine can be directly specified without the need to measure the wear parameter, which is possibly difficult to access in practice; the functional dependency which is determined, and possibly further optimized and/or adapted and/or predicted, during the course of the regression serves for reliably calculating the wear parameter. A measurement of the wear parameter for the internal combustion engine which is to be maintained and operated can thus be eliminated. Instead, a different approach is taken, as discussed above:

identifying at least one wear parameter (Y), which tribologically determines the remaining service life of the service-life-limiting engine element, for the wear of the engine element, assigning to a number (k) of usage conditions of the internal combustion engine respective parameter values (X_k) which are operatively related to the wear parameter (Y).

It is thus possible for the usage conditions to be advantageously selected such that they can be determined in automated fashion or particularly easily manually. In this way, it is possible for periods of nonoperation of the internal combustion engine, and corresponding downtime costs, to be avoided without the need to accept an increased risk of failures of the internal combustion engine.

The regressive calculation of regression coefficients for the functional dependency can advantageously be performed by means of fundamentally known mathematical regression algorithms. This permits a particularly accurate regressive calculation of the regression coefficients for the functional dependency. In particular, by means of such a mathematical regression algorithm, it is possible to calculate an error interval of the regressively calculated regression coefficients. This is of assistance in an objective evaluation of the estimated remaining service life by a user of the internal combustion engine.

The use of a single service-life-limiting engine element of the internal combustion engine is advantageous because, in this way, a complex analysis of multiple engine elements of the internal combustion engine is avoided. For example, the use of a bearing shell, in particular of the connecting-rod bearing, of the internal combustion engine as a service-life-limiting engine element is particularly advantageous because, in this way, it is possible for the remaining service life of the internal combustion engine to be inferred particularly accurately.

The sequence of the steps of the method according to the invention may differ from the sequence stated. In particular, the test values for the multiplicity of usage conditions may also be determined prior to the test values for the wear parameter.

The specification of a wear information item is realized by means of a relationship, which is assumed to be known, between the remaining service life of the internal combustion engine and the calculated wear parameter. The method step of the regressive calculation is regressive in the sense that a cause, specifically the functional dependency, is inferred from an observable effect, that is to say the values of the parameters of the usage conditions.

According to the concept of the invention, wear is to be understood basically to mean not only mechanical abrasion on the engine element or the like but any type of measurable fatigue of or change to the engine element, or in the material of the engine element, following thermomechanical loading; in particular, this also encompasses changes in the internal structure of the engine element.

According to a further aspect, the invention relates to a control device of an internal combustion engine. Here, the control device has a service-life-limiting engine element, in particular a bearing shell, in particular with a connecting-rod bearing, wherein the control device is connected to the internal combustion engine and is designed to output a warning signal in accordance with a wear information item estimated by means of a refinement of the method according to the invention.

The control device according to the invention advantageously makes it possible to receive a warning signal and thus notify a user of the internal combustion engine if the remaining service life of the internal combustion engine lies below a predetermined threshold value. The warning signal may be an electrical warning signal at a central control unit of an object which has the internal combustion engine, in particular of a vehicle or of a plant. The warning signal may likewise be an optical or acoustic warning signal which is output directly to a user of the internal combustion engine via a user interface.

In one refinement, a control device is additionally provided which is connected to the internal combustion engine, wherein the control device outputs a warning signal in accordance with the estimated wear information item. In this way, a user of the method is informed with regard to the wear information item. In a preferred refinement, a warning signal is output only if the estimated remaining service life lies below a predetermined threshold value of the remaining service life of the internal combustion engines. In one variant of this refinement, the warning signal is an electrical signal which is transmitted to a central control unit of the object operated means of the internal combustion engine, in particular of a plant or of a vehicle. In another variant, the warning signal is a visual or acoustic warning signal which is perceptible to a user of the internal combustion engines via a user interface.

In one refinement of the control device, the control device furthermore has a detection module which is designed to automatically newly determine at least one usage conditions which varies during the operation of the internal combustion engine to be operated, and to perform the estimation of the wear information item with the aid of the wear parameter newly calculated by means of the newly determined variable usage conditions using the established functional dependency. In this way, the wear information item is adapted to a present use of the internal combustion engines, such that, for example in the case of gentle operation of the internal combustion engines, a remaining service life can be correspondingly corrected toward longer times. The automated determination of usage conditions has the advantage, both for this refinement and for the refinements mentioned above, that the user of the internal combustion engines or a technician working on the internal combustion engines does not have to manually determine the usage conditions.

The control device is preferably designed to record a present service life of the internal combustion engine and to subtract this present service life from a past estimation of the remaining service life. In this way, a present value for the remaining service life is estimated by the control device.

According to a further aspect, the invention relates to an internal combustion engine having a service-life-limiting engine element, in particular a bearing shell, in particular a connecting-rod bearing, which internal combustion engine has a control device according to the invention.

According to a further aspect, the invention relates to an item of software which has program means configured to control a method for operating an internal combustion engine according to at least one refinement of the method according to the invention, specifically by storage of the functional dependency and estimation of the wear information item from the wear parameter assigned to the usage conditions of the service-life-limiting engine element. According to a further aspect of the invention, the software item is preferably executed automatically within a processor. Furthermore, the software is preferably executed in a processor which is arranged within the control device according to the invention and/or within the internal combustion engine system according to the invention.

Advantageous refinements of the invention emerge from the subclaims and specify, in detail, advantageous possibilities for realizing the above-discussed concept in the context of the stated object and with regard to further advantages.

It is advantageously provided that
during the predetermined operation of the number (n) of test internal combustion engines, the measurement of the wear parameter is performed after a predefined operating time for each of the test internal combustion engines, wherein the wear parameter comprises a wear information item which is characteristic of a service-life-limiting time interval such that a remaining service life of the internal combustion engine can be specified.

It is preferably provided that, for the movable engine part and/or at least one engine element which holds said movable engine part and which is subject to wear,
contamination or fouling is predicted, and/or
aging of operating media is predicted.

Advantageously, regressible test values from long-term operation of the test internal combustion engines are filtered, and a regressible selection of test internal combustion engines is determined. This increases the reliability of the regression and avoids systematic errors owing to non-regressible test values, which could originate for example from the start-up phase of a test internal combustion engine or from a servicing requirement thereof. Basically, a large sample size, that is to say a large number n of test internal combustion engines, leads to a more accurate result for the regressively calculated regression coefficients. Thus, a large sample size also increases an accuracy of the estimated remaining service life in relation to a smaller sample size.

In a preferred refinement, a number of test values for the wear parameters of the respective test engine element is determined at a multiplicity of different first and second operating points of the respective test internal combustion engine. Each of the different operating points permits a renewed utilization of the determined test values for the multiplicity of usage conditions for a renewed assignment to the further number of values for the wear parameters. The influence of a usage condition leads in particular to a different dependency and therefore to a different regression coefficient for the wear parameter at one operating point than for the wear parameter at another operating point.

In a preferred refinement, in addition to the measurement of the number of test values of the wear parameters, a measurement of a further multiplicity of test values for the usage conditions is performed at the multiplicity of different operating times. This refinement is particularly advantageous if the engine element parameters are variable during operation of the test internal combustion engine over the service life thereof. For example, it can be taken into consideration that the test value for the wear parameter is subject to only small changes over a long period of time, but changes more quickly in the run-in phase or with progressive aging.

In a particularly preferred refinement, the measurement of the wear parameter is performed for the first time after a minimum operating time of the test internal combustion engine of over one year, preferably over 3 years. In this way, in this refinement, it is advantageously ensured that a component of run-in wear of the test internal combustion engines for the ascertained functional dependency is low or remains disregarded and thus has no systematic erroneous influence.

In a particularly preferred refinement, for the regressive calculation of the functional dependency, an in particular linear dependency of the wear parameter on the multiplicity of linearly independent usage conditions is assumed. In this refinement, the regressive calculation can be performed particularly easily and quickly, because numerically implemented mathematical methods for performing such a so-called linear regression are particularly fast. The assumption of a linear dependency of the wear parameter is particularly accurate if the test values for the multiplicity of usage conditions differ only within a relatively small numerical interval. In accordance with the known concept of the Taylor approximation, the assumption of a linear dependency in relation to an associated value is always justified for such small changes.

In a particularly preferred variant of the present refinement, the regressive calculation of the regression coefficients is performed by means of the linear model, illustrated below in matrix form, for mathematical regression:

$$\begin{bmatrix} y_1 \\ \vdots \\ y_n \end{bmatrix} = \begin{bmatrix} 1 & x_{11} & \cdots & x_{1k} \\ \vdots & \vdots & \ddots & \vdots \\ 1 & x_{n1} & \cdots & x_{nk} \end{bmatrix} \cdot \begin{bmatrix} \beta_1 \\ \vdots \\ \beta_{k+1} \end{bmatrix} + \begin{bmatrix} \varepsilon_1 \\ \vdots \\ \varepsilon_n \end{bmatrix} \quad (1)$$

The number n of y values stand for the determined test values for the wear parameter, whereas the x values represent the corresponding n determined test values, specifically for each of the k usage conditions. There are thus n test internal combustion engines which are utilized for the determination of the test values of the usage conditions. The unknown values of this linear model are the sought regression coefficients $\beta_1$ to $\beta_{k+1}$ for each of the k usage conditions (and for the constant absolute element, see equation (2)), and the values $\varepsilon_1$ to $\varepsilon_n$ for an in each case inevitable error within the linear model.

Within this linear model, mathematical methods can be applied only if the number n of the determined test values, that is to say the number of test internal combustion engines, is greater than the number of usage conditions, that is to say if the linear equation system is overdeterminate. In the proposed particularly preferred variant of the method, this is the case.

Preferably, for the method according to the concept of the invention, at least five usage conditions are considered. For the above-stated linear model for mathematical regression, the number n of test internal combustion engines preferably amounts to 50+8*k, wherein k is the number of usage conditions.

Such an equation system equation (1) can be solved by means of a multiplicity of known numerical methods with minimization of the values for the errors ($\varepsilon_1$ to $\varepsilon_n$). Such a solution leads to the regressively calculated regression coefficients which define the functional dependency between the wear parameter and the number of usage conditions, generally for example as follows:

$$Y^n = f(X_1^n, \ldots, X_k^n) = \beta_1 + \beta_2 \cdot X_1^n + \ldots + \beta_{j+1} \cdot X_j^n + \ldots \beta_{k+1} \cdot X_k^n \quad (2)$$

According to the invention, following the regressive calculation of the regression coefficients $\beta_1$ to $\beta_{k+1}$ and the thus defined functional dependency f for the internal combustion engine to be operated, the wear parameter can be inferred from the usage conditions without the need to determine this wear parameter.

The polynomial presented in equation (2) is linear because, in the present refinement, a linear dependency has been assumed. In other refinements, the polynomial which represents the functional dependency is of an order higher than 1. In a particularly preferred refinement, the calculation of the functional dependency involves the use of the least squares method. For the linear model presented in equation (1), this means that the sum $\Sigma_{i=1}^{n} \varepsilon_i^2$ of the errors $\varepsilon_1$ to $\varepsilon_n$ is minimized. This may preferably be performed numerically. It is particularly preferably the case that, in the use of the least squares method, a numerical method is utilized which iteratively solves the linear equation systems presented in equation (1) in order to minimize the squares of the errors $\varepsilon_1$ to $\varepsilon_n$. By means of this refinement, the remaining service life of the internal combustion engine is determined particularly accurately, whereby a reliability of the estimated wear information item is increased.

In one refinement, the wear information item is characteristic of a time range of the remaining service life of the internal combustion engine, wherein the time range corresponds to an inaccuracy of the regressively calculated functional dependency. In one variant of this refinement, a linear dependency is assumed for the regressive calculation of the functional dependency. Here, a respective inaccuracy of the regressive calculation arises from the values $\varepsilon_1$ to $\varepsilon_n$, presented in equation (1), for a respective error owing to inaccuracies of the regression coefficients. In a further variant of this refinement, the inaccuracy of the calculated functional dependency arises from an inaccuracy, taken into consideration in accordance with the known Gaussian error propagation law, in the determination of the test values for the wear parameter and the usage conditions. In the context of this refinement, it is advantageously possible for an objective informative value of the remaining service life estimated by means of the method according to the invention to be assessed by the user. A large inaccuracy in the regressively calculated functional dependency leads to a large time range of the remaining service life, whereby a user themself can decide how the wear information item should be taken into consideration for future repair planning for the internal combustion engines. In particular, the regressive calculation of an inaccuracy makes it possible for a first time range of the remaining service life to be specified in which it is highly likely that damage will not yet occur, while a second time range of the remaining service life is specified in which an overhaul of the internal combustion engine will be strongly recommended, because the onset of damage is likely.

It is advantageously provided that the usage conditions which vary during the operation of the internal combustion engine that is respectively to be operated and of the in particular regressible selection of test internal combustion engines are read out from the internal combustion engine that is respectively to be operated as values of one or more of usage conditions, in particular usage parameters, operating parameters, handling parameters and/or boundary parameters of the internal combustion engine.

The parameter values relating to the usage conditions advantageously comprise one or more parameters of the internal combustion engine which are in particular read out from the internal combustion engine as values and are selected from the group comprising: usage parameters, operating parameters, handling parameters, boundary parameters.

This refinement, following the concept of the invention, advantageously circumvents the explicit determination of tribological relationships and thus also avoids the complexity and natural inaccuracy inherent in this approach. This is because such known analytical approaches often additionally likewise disregard maintenance and environmental factors of an internal combustion engine, such as factors of aging in lubricants. Instead, the concept of the invention is based on the comprehensive consideration of usage conditions of an internal combustion engine, which are moreover generally relatively easily accessible from the monitoring of the internal combustion engine.

Usage parameters are thus advantageously selected for a group of variables which are read out in relation to an operating point in an operating characteristic map of the internal combustion engine to be operated, comprising:

a mean degree of utilization of the internal combustion engine, a frequency of load alterations, use in a characteristic map region of nominal operation or outside nominal operation.

Operating parameters are advantageously selected for a group of variables which are read out in relation to a measured value of the internal combustion engine at an operating point of the internal combustion engine to be operated, comprising:

a maximum ignition pressure, a mean pressure in the cylinder, a mean piston speed, a power per cylinder.

Handling parameters are advantageously selected for a group of variables which are read out in relation to a value of the internal combustion engine which is held fixed for a maintenance aspect or an environmental aspect of the internal combustion engine to be operated, comprising:

an oil quality, oil viscosity, a mean interval between past oil changes and/or maintenance operations.

Boundary parameters are advantageously selected for a group of variables which in relation to an environmental aspect of the internal combustion engine to be operated, comprising:

use of the internal combustion engine at a particular geographical altitude, at particular barometric values, at particular temperature values.

It is advantageously provided that the service-life-limiting engine element which holds said movable engine part and which is subject to wear:

- is a bearing shell, and the measured wear parameter is a remaining thickness of a wearing layer of the bearing shell, and/or
- is a piston ring, and the measured wear parameter is a remaining thickness of the piston ring, and/or
- is a cylinder liner and/or is an inlet or outlet valve, and the measured wear parameter is a honing and/or an oil retention volume resulting from a surface roughness.

As stated above, this is a nonexhaustive advantageous list—according to the concept of the invention, wear is to be understood basically to mean not only mechanical abrasion on the engine element or the like. The measured wear parameter could also encompass any type of measurable fatigue of or change to the engine element, or in the material of the engine element, following thermomechanical loading; in particular, this also encompasses changes in the internal structure of the engine element.

In one preferred refinement, the service-life-limiting engine element is a bearing shell, and the multiplicity of usage conditions comprises at least one parameter selected from a group comprising: bearing width, bearing shell diameter, journal diameter, eccentricity, mean lubricating film thickness, minimum lubricating film thickness, relative bearing play, supported weight.

The test values of the usage conditions selected from the group from this refinement may advantageously be determined prior to the operation of the multiplicity of test internal combustion engines. There is therefore no need, either during the operation of the test internal combustion engines or during the operation of the internal combustion engine, for usage conditions to be determined in a cumbersome manner during the operation or during an operating interval through dismantling of the respective internal combustion engines. In one variant of this refinement, in which all usage conditions from the stated group are selected, the wear information item is estimated already prior to operation of the internal combustion engines, because all usage conditions required for this estimation are determined already prior to the operation of the internal combustion engines.

In another refinement, the service-life-limiting engine element is a piston ring, and the multiplicity of usage conditions comprises at least one parameter selected from a group comprising: piston ring thickness, piston ring width, mean lubricating film thickness on a cylinder surface facing the piston ring, mean spacing between piston ring and cylinder surface.

In a further refinement, the service-life-limiting engine element is a cylinder liner, and the multiplicity of usage conditions comprises at least one parameter selected from a group comprising: spacing between cylinder liner and piston, surface roughness of a surface of the cylinder liner.

In one refinement, the multiplicity of usage conditions comprises at least one usage conditions which varies during the operation in each case of the internal combustion engine to be operated and of the test internal combustion engine. In this refinement, the remaining service life of the internal combustion engines can be estimated particularly accurately, because the usage conditions which vary during operation make it possible to infer a manner of operating the internal combustion engines by means of which the remaining service life can be increased or decreased in relation to an estimation prior to the operation of the internal combustion engine. In particular, a load profile of the internal combustion engine can be taken into consideration for the estimation of the remaining service life.

In a particularly preferred refinement, the usage conditions which vary during the operation of the internal combustion engine to be operated in each case and of the test internal combustion engine are selected from a group comprising: a mean degree of utilization, mean pressure, oil quality, mean piston speed, maximum ignition pressure, mean interval between past maintenance operations. In a further variant, the multiplicity of usage conditions comprises both usage conditions which can be determined prior to operation of the internal combustion engines and usage conditions which vary during the operation of the internal combustion engines and which are determined during operation of the internal combustion engines.

In a particularly preferred refinement, the service-life-limiting engine element is a bearing shell. Preferably, the measured wear parameter is a thickness of a wearing layer of the bearing shell.

It is advantageous here that the dependency between the thickness of the wearing layer of the bearing shell and the remaining service life of the internal combustion engines is known. Consequently, inferences relating to the wear parameter by means of the regressively calculated functional dependency lead directly to the estimation of the wear information item.

In an alternative refinement, the wear parameter is directly the remaining service life, such that the test internal combustion engines are operated until the onset of damage.

Exemplary embodiments of the invention will now be described below on the basis of the drawing in comparison with the prior art, which is likewise partially illustrated. The drawing is intended to illustrate the exemplary embodiments not necessarily to scale; rather, the drawing is of schematic and/or slightly distorted form where expedient for explanatory purposes. With regard to additions to the teaching that directly emerges from the drawing, reference is made to the relevant prior art. Note here that a wide variety of modifications and changes may be made with regard to the form and the detail of an embodiment without departing from the general concept of the invention. The features of the invention disclosed in the description, in the drawing and in the claims may be essential, both individually and in any desired combination, to the refinement of the invention. Furthermore, the scope of the invention encompasses all combinations of at least two of the features disclosed in the description, in the drawing and/or in the claims. The general concept of the invention is not restricted to the exact form or the detail of the preferred embodiment presented and described below, nor is it restricted to subject matter that would be limited in relation to the subject matter claimed in the claims. In the case of specified dimension ranges, it is also the intention that values lying within the stated limits are disclosed as limit values and may be used and claimed as desired.

BRIEF DESCRIPTION OF THE DRAWING

Further advantages, features and details of the invention will emerge from the following description of the preferred exemplary embodiments and on the basis of the drawing, in which:

FIG. 1A shows an example of a movable engine part and of at least one engine element which holds said movable engine part and which is subject to wear, as a service-life-limiting engine element, in the case of an internal combustion engine;

FIG. 4B is a specific illustration of an assignment of a value of a parameter relating to usage conditions to a corresponding value of a wear parameter by means of regression;

DETAILED DESCRIPTION OF THE INVENTION

Figure 1B:
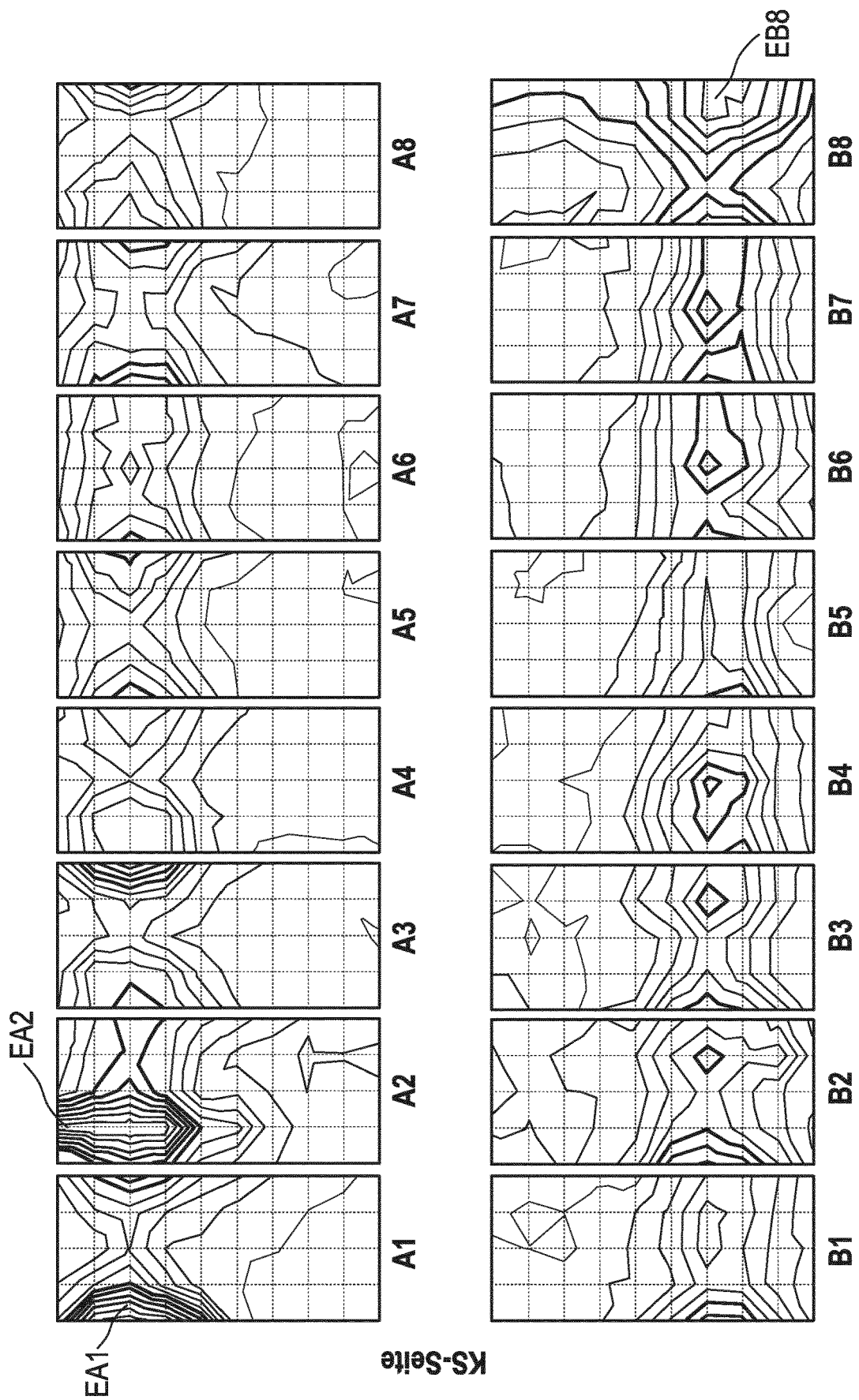
FIG. 1B shows a representative measurement result from wear measurements performed on a connecting-rod bearing, with indication of a running layer thickness or of a lubricating gap for the purposes of specifying a measured value for a wear parameter.

FIG. 1A shows an example of a movable engine part and of at least one engine element which holds said movable engine part and which is subject to wear, as a service-life-limiting engine element, in the case of an internal combustion engine, specifically in this case the bearing shells of a connecting-rod bearing and main bearing on a crankshaft, against the background of a hydrodynamic operating principle of a plain bearing principle of a bearing of the crankshaft.

In this regard, FIG. 1A schematically shows, in view (i), an internal combustion engine 1 with a motor block 10 which has a number (for example 4, 6, 8, 12, 16 or 24 or a similar number) of cylinders 11, 12, which are illustrated representatively here. A piston 13, 14 running in each case in the cylinders 11, 12 transmits its movement in each case via a connecting rod 15, 16 to a crankshaft 20. The connecting rods 15, 16 are in each case mounted by means of a connecting-rod bearing 21 on the crankshaft 20, wherein in each case one crank web 17 connects a connecting-rod bearing 21 to a shaft journal 18 of the crankshaft 20. The crankshaft 20 itself is in this case mounted, at two further shaft journals 19 of its terminating ends, by means of two main bearings 22 on the motor block 10. In principle, on the motor block 10, there is also mounted a camshaft (not shown here) which is used as part of the valve drive in order to open and close the inlet and outlet valves of the cylinders in accordance with construction-related control timing.

The bearing shells 23, 24, shown in view (ii) of FIG. 1A, of a connecting-rod bearing and main bearing on a crankshaft or of a bearing of the camshaft are relevant bearing elements of the internal combustion engine against the background of a hydrodynamic operating principle of a plain bearing principle of a bearing. For these, as service-life-limiting engine elements, it is possible to predict a remaining service life in order, from this, to determine a service-life-limiting time interval.

Against the background of a hydrodynamic operating principle of a plain bearing principle of a bearing of the crankshaft, one would assume that basically any ignition exerts a force shock K which is damaging to the connecting-rod bearing and main bearing on the crankshaft; the loaded bearing halves are illustrated with shading in view (i) of FIG. 1. The overall damage would thus basically arise from the number of crankshaft rotations over the service life of the motor with said connecting-rod bearing and main bearing.

The model depicted in view (iii) of FIG. 1A is based on a lubricating gap 25 between shaft 18, 19 and bearing shell 23, 24, the lubricating film thickness 26 of which lubricating gap could in principle be calculated in a manner dependent on a multiplicity of factors in order to analytically determine wear-induced damage to the bearing shells. As discussed in the introduction, such an approach has however proven to be overly complex and furthermore inadequate, because not only is the model itself too inaccurate, but also, important and relevant further influences on the damage are not taken into consideration in this model.

FIG. 1B shows, by way of example, the result of a wear measurement performed on bearing shells 23, 24 of a connecting-rod bearing and main bearing; specifically, here, the remaining running layer thickness, illustrated in areal form, at the cylinders A1 to A8 and B1 to B8—that is to say 16 cylinders—of a motor 1 (specifically of a test internal combustion engine), as is symbolically shown in FIG. 1A, after long-term operation. It is possible to see the severe decreases EA1, EA2 and EB8 in the running layer thicknesses at the cylinders A1, A2 and B8 as light patches—in particular severe decreases EB8 in the running layer thickness on that side of the motor 1 which is opposite the power output side, on the bearing shells 23, 24 assigned to the cylinder B8; this may be for example a coating thickness of an AlSn layer of considerably less than 20 μm. Such a running layer thickness can be identified for example as a wear parameter Y, which tribologically determines the remaining service life of the service-life-limiting engine element—in this case the bearing shells 23, 24—, for the wear of the engine element.

By way of illustration, on the basis of this example, a relationship between a possible remaining service life Y of the bearing shells 23, 24 of a connecting-rod bearing and main bearing 21, 22 can be established on the basis of a bearing coating as an exemplary wear parameter as a function of various parameters relating to usage conditions of the internal combustion engine. For this purpose, mathematical regression is utilized—that is to say a statistical analysis method in the case of which the mathematical relationship between a dependent variable Y—in this case the remaining layer thickness or possible remaining service life of the bearing shell coating—and multiple linearly independent variables X—for example in this case the mean degree of utilization, maximum ignition pressure, mean piston speed, etc.—is ascertained. Thus, a number k of parameter values X_k which relate to usage conditions of the internal combustion engine and which are operatively related to the wear parameter Y of the internal combustion engine are assigned to the wear parameter Y.

In the test, the multiple linearly independent variables X are known from operation, and the dependent variables Y are measured; for example, as above, the remaining layer thickness or possible remaining service life of the bearing shell coating Y of the bearing shells 23, 24 of a connecting-rod bearing and main bearing 21, 22. During the course of predetermined operation of a number n of test internal combustion engines, each having a test engine element—specifically for example the bearing shells 23, 24 of a connecting-rod bearing and main bearing 21, 22—the test engine element of a test internal combustion engine corresponds in each case to the service-life-limiting engine element of the internal combustion engine, and, during the predetermined operation, the usage conditions X of the test internal combustion engines are acquired. A test value of the wear parameter Y for the wear of the test engine element is measured in each case on the test engine element of each of the number n of test internal combustion engines after the predetermined operation thereof. This is performed in that the functional dependency between the measured wear parameter Y, on the one hand, and the acquired usage conditions X, on the other hand, of the test internal combustion engines can be specified.

The coefficients $b_j$ to be ascertained can thus be ascertained in an overdeterminate linear equation system. This corresponds to a regressive determination of a functional dependency between a number k of usage conditions X of the internal combustion engine, on the one hand, and the wear parameter Y, on the other hand. As a result, a regression function is obtained which as accurately as possible reflects the mathematical relationship between the multiple linearly independent variables X from the operation and the dependent variables Y—equation (3) below.

Simple example of a possible result:

$$Y = b_0 + b_1 * X_1 + b_2 * X_2 + \ldots + b_j * X_j + \ldots + b_J * X_J$$

Y=Possible remaining service life
$X_1$=Mean degree of utilization
$X_2$=Mean pressure
$X_j$=Oil quality (type 1, 2, 3)
$b_j$=Coefficient $b_j$ to be ascertained If, during the real operation of an internal combustion engine, a TBO interval for this is to be specified, the regression function for said internal combustion engine is known. Then, a value of the wear parameter Y for the service-life-limiting engine element of the internal combustion engine which is to be operated and maintained is calculated by means of the regressively determined functional dependency, and a remaining service life of the service-life-limiting engine element is predicted. The service-life-limiting time interval of the internal combustion engine which is to be operated and maintained is determined from the remaining service life of the service-life-limiting engine element.

Figure 2:
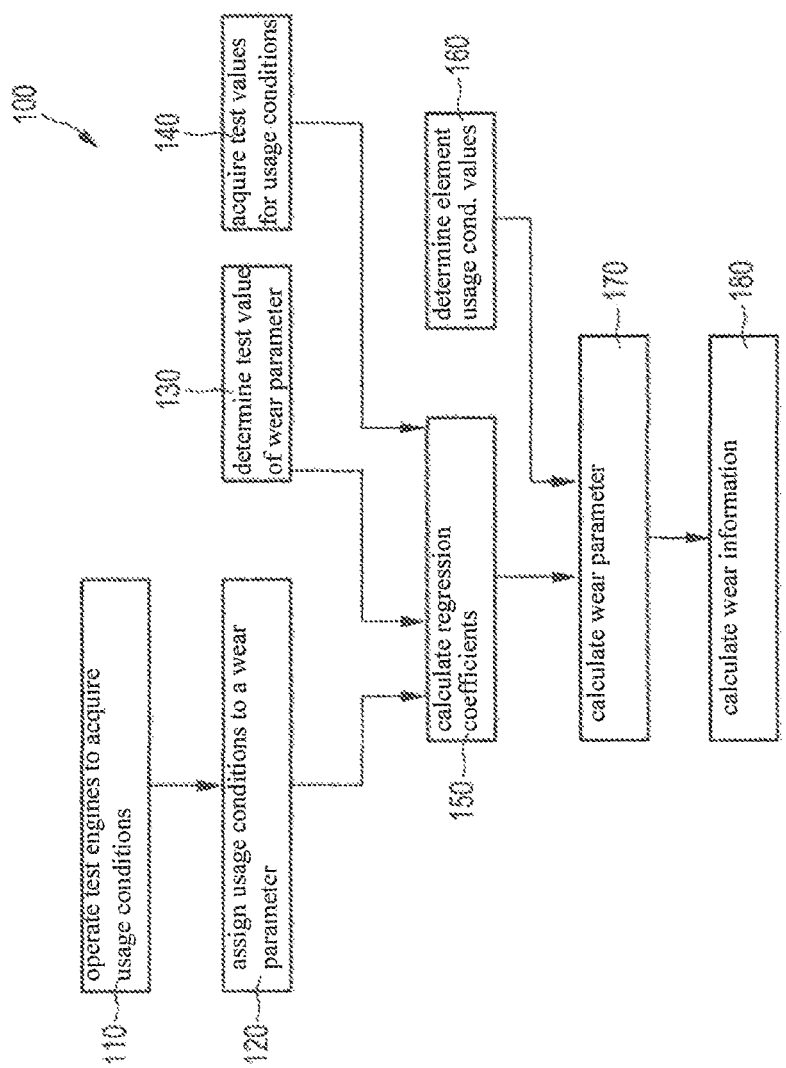
FIG. 2 is a schematic illustration of a preferred embodiment of a method for the operation and maintenance of an internal combustion engine according to the concept of the invention.

FIG. 2 shows, in schematically abstracted form, a preferred embodiment of a method 100 according to the concept of the invention for operating an internal combustion engine with a service-life-limiting engine element—for example the bearing shells 23, 24 of a connecting-rod bearing and main bearing 21, 22 as shown in FIG. 1. The service-life-limiting engine element in each case of the internal combustion engine to be operated and of the test internal combustion engine may in particular alternatively or additionally be selected from a group comprising: a bearing shell, in particular with a connecting-rod bearing, a cylinder liner, a piston ring, an inlet or outlet valve.

The method 100 has the steps discussed below.

A first step 110 comprises operating a multiplicity of test internal combustion engines each comprising a test engine element. The test internal combustion engines thus each have a test engine element, wherein, in each case, the test engine element of a test internal combustion engine corresponds to the service-life-limiting engine element of the internal combustion engine. During the predetermined operation, the usage conditions X of the test internal combustion engines are acquired.

Said multiplicity of usage conditions are, in the step 120, assigned to a wear parameter for the regressive determination of a functional dependency between the wear parameter and the multiplicity of usage conditions. The parameter values relating to the usage conditions may comprise one or more parameters of the internal combustion engine, in particular are read out from the internal combustion engine as values, and are selected from the group comprising: usage parameters, operating parameters, handling parameters, boundary parameters.

In the step 130, a test value for a wear parameter is determined, in particular measured, in each case for the multiplicity of test internal combustion engines during the operation of the multiplicity of test internal combustion engines. In the step 140, for the multiplicity of test internal combustion engines, test values for the multiplicity of usage conditions that are assigned to the wear parameter are acquired during the operation of the multiplicity of test internal combustion engines.

In the step 150, regression coefficients for the functional dependency are regressively calculated by means of the test values for the wear parameter and the usage conditions, with the functional dependency being specified by means of the regression coefficients. The regression function for an internal combustion engine is thus known. The steps 110, 120, 130, 140, 150 thus relate to operation of the multiplicity of test internal combustion engines with the aim of regressively calculating the functional dependency. A sequence of the method steps may deviate from the sequence of the exemplary embodiment illustrated in FIG. 2. In particular, in a variant which is not illustrated, the determination of the test value for the wear parameter Y (step 130) and the determination of the test values for the usage conditions X (step 140) may be interchanged.

The following steps 160, 170, 180 relate, in terms of content, to the internal combustion engine to be operated. In the step 160, it is thus possible for values for the multiplicity of usage conditions of the service-life-limiting engine element of the internal combustion engine to be operated to be determined, and, in the subsequent step 170, the wear parameter, assigned to the usage conditions of the service-life-limiting engine element, of the internal combustion engine to be operated is calculated by means of the established functional dependency of the regression function. In the step 180, a wear information item which is characteristic of a remaining service life of the internal combustion engine is calculated from the calculated wear parameter.

Figure 3:
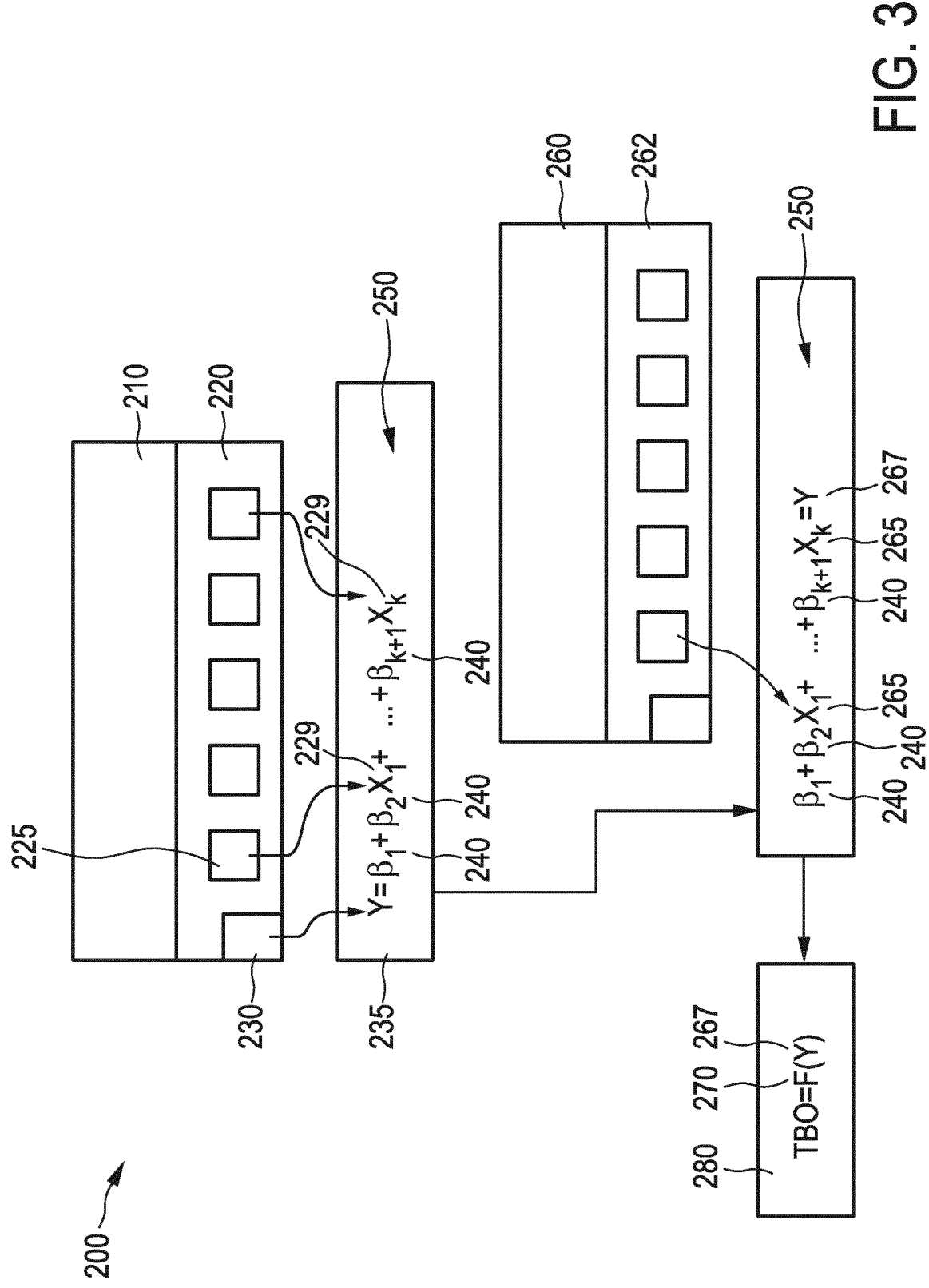
FIG. 3 is a schematic illustration of a regressive determination of a functional dependency between usage conditions X of the internal combustion engine, on the one hand, and the wear parameter Y, on the other hand, in the context of the preferred embodiment.

FIG. 3 shows a structure of a regressive calculation 200 of the functional dependency in the context of a preferred embodiment of the method 100. The structure shows the test internal combustion engines 210 with a service-life-limiting test engine element 220. The test engine element 220 has usage conditions 225. During the operation of the internal combustion engine that is respectively to be operated and of the, in particular regressible, selection of test internal combustion engines, the variable usage conditions are read out from the respective internal combustion engine; preferably as values of one or more of usage conditions, in particular usage parameters, operating parameters, handling parameters and/or boundary parameters of the internal combustion engine. The test engine element 220 has, in the present case, five usage conditions 225.

It is for example possible for usage parameters to be selected for a group of variables which are read out in relation to an operating point in an operating characteristic map of the internal combustion engine to be operated, comprising: a mean degree of utilization of the internal combustion engine, a frequency of load alterations, use in a characteristic map region of nominal operation or outside nominal operation.

For example, operating parameters may be selected for a group of variables which are read out in relation to a measured value of the internal combustion engine at an operating point of the internal combustion engine to be operated, comprising: a maximum ignition pressure, a mean pressure in the cylinder, a mean piston speed, a power per cylinder.

For example, handling parameters may be selected for a group of variables which are read out in relation to a value of the internal combustion engine which is held fixed for a maintenance aspect or an environmental aspect of the internal combustion engine to be operated, comprising: an oil quality, oil viscosity, a mean interval between past oil changes and/or maintenance operations.

For example, boundary parameters may be selected for a group of variables which are read out in relation to an environmental aspect of the internal combustion engine to be operated, comprising:

use of the internal combustion engine at a particular geographical altitude, at particular barometric values, at particular temperature values.

For the five usage conditions in the present case (that is to say, in this case, k=5), test values x 229 are determined, wherein this is illustrated only for the test internal combustion engine 210. It is of note that these structural part parameters comprises in particular but not exclusively mere measurable parameters assigned to the engine element, but also other potential influential parameters such as usage conditions of the internal combustion engine and the like. A corresponding approach is followed for all further test internal combustion engines from the multiplicity of test internal combustion engines. The determined test values 229 are assigned to a wear parameter 230 of the same engine element 220. Furthermore, a test value y 235 of the wear parameter 230 is determined, in particular measured; specifically for example, as described above, is measured on a test internal combustion engine.

By means of this assignment of preferably read-out test values 229 of the usage conditions 225 to the, preferably measured, test values 235 of the wear parameter 230, a regressive calculation of the regression coefficients β 240 is performed on the basis of a regression model. An exact description of this calculation is stated above in the context of equations (1) and (2)—an example is shown in equation (3). The functional dependency 250 then described by the regression coefficients 240 is consequently based on operation of a multiplicity of test internal combustion engines 210.

Figure 4A:
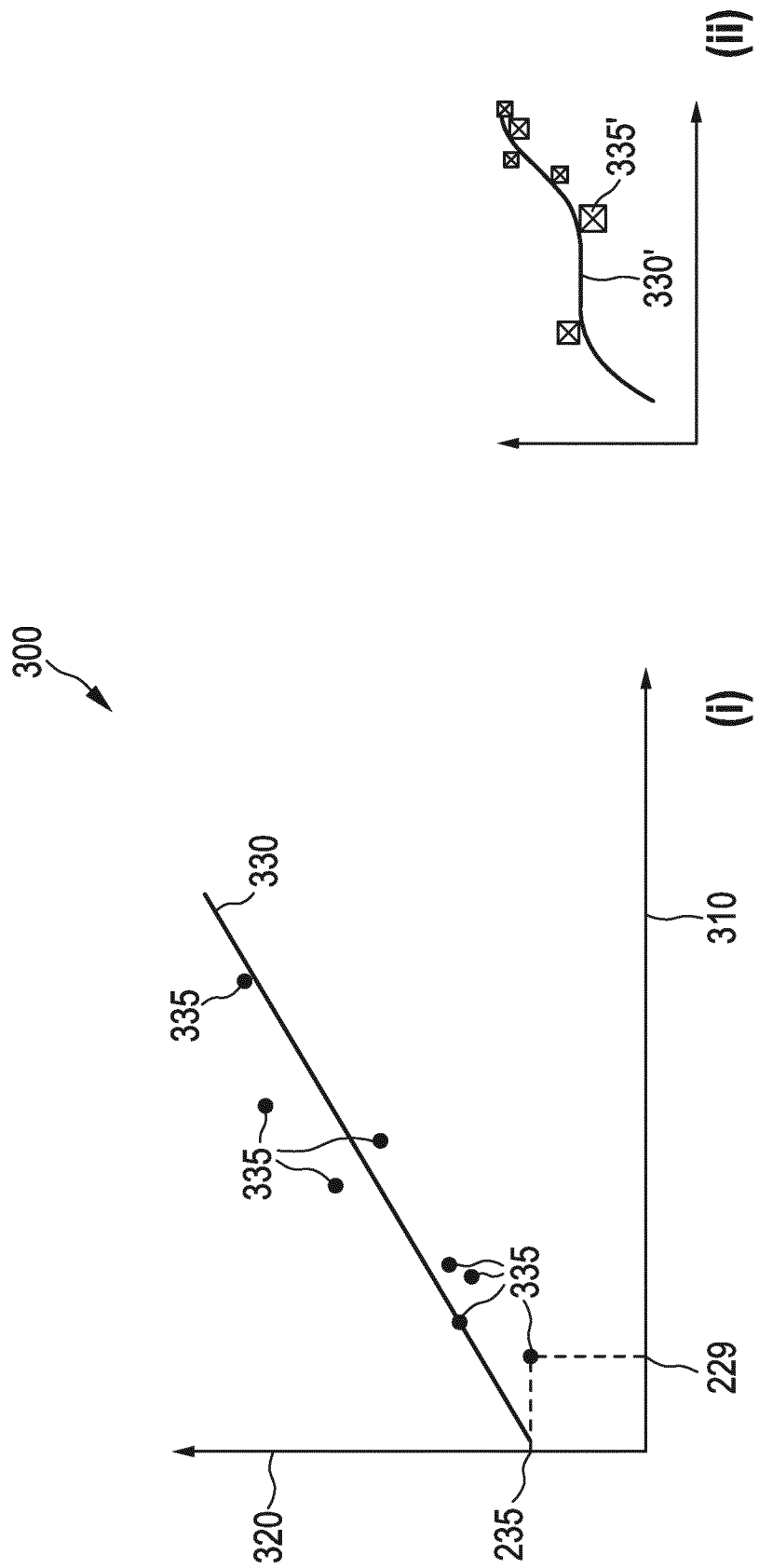
FIG. 4A is an exemplary illustration of an assignment of test values of usage conditions to corresponding test values of a wear parameter by means of linear regression (view (i)) and general regression (view (ii))

An example of such a result of the regression, specifically the functional dependency 250 described by the regression coefficients 240, is discussed above in relation to FIG. 1, and is illustrated in FIG. 4A in view (i) as a regression line 330 relating to test values 335. In another refinement of the method, a non-linear regression model (not shown here) may be used, in which, consequently, no linear dependency is assumed between values of the usage conditions and values of the wear parameter; an example is illustrated in FIG. 4A in view (ii) as a regression curve 330' relating to test values 335'. In both cases, the minimum square errors method may be used in order to determine the function coefficients in the context of the regression.

For the internal combustion engines 260 to be operated, the multiplicity of values X 265 for the usage conditions of the engine element 262 of the internal combustion engine 260 is then determined. Inserted into the regressively calculated functional dependency 250, the determined values yield a value Y 267 for the wear parameter of the internal combustion engines 260 to be operated. A remaining service life TBO 280 of the internal combustion engine 260 follows from the wear parameter by means of an assignment rule F 270 known from empirical values, such that the corresponding wear information item is estimated by means of the functional dependency 250.

Referring further to FIG. 4A (view (i)) and, in detail, FIG. 4B, these show an assignment 300, 300' of test values 229 of usage conditions to corresponding test values 235 of the associated wear parameter (FIG. 4A), and an assignment of the value 265 of a usage condition to the corresponding value 267 of a wear parameter (FIG. 4B) in the context of a linear regression.

In each of FIG. 4A and FIG. 4B, a parameter for illustrating a selected usage condition is plotted along the x axis 310, 310', and a wear parameter which characterizes the wear of the relevant engine element is plotted along the y axis 320, 320'.

In the assignment 300, the regressively determined functional dependency 250 between the selected usage conditions and the wear parameter is illustrated as a regression line 330. For the sake of clarity, only a two-dimensional illustration is shown, such that the regression line 330 shows only a functional dependency relating to a single usage condition—in general, a regression line will self-evidently be understood to mean a linear relationship which links a multiplicity of usage conditions to a wear parameter. It is also to be understood that the regression may also take into consideration multiple wear parameters.

Since the test values 229, 235 are, in the present case, determined within the test internal combustion engines, and the assumed linear regression model for the regressive calculation of the regression coefficients is falsified by non-linear effects within the system, such as for example friction effects, the pairs of test values 335 do not lie exactly on the regression line 330 described by the regression coefficients 240. The inaccuracy of the regressively calculated regression coefficients 240 may be determined by means of numerical methods, as discussed above in the context of equation (1).

Each of the illustrated points within the diagram in FIG. 4A represents a pair 335 of test values and thus an assignment of a test value of a usage condition to a test value of the wear parameter. Here, each value pair thus formed corresponds to a corresponding measurement within a single test internal combustion engine of the multiplicity of test internal combustion engines. FIG. 4B shows the regression line 330 determined from the test values 229, 235.

The regression line 330 established by means of the regressively calculated regression coefficients 240 is then used for the internal combustion engine to be operated, in order to calculate the wear parameter from a multiplicity of values 265 for the usage conditions. The determination of a multiplicity of values 265 for the usage conditions (of which in this case only one is illustrated owing to the two-dimensional illustration selected for the sake of clarity) leads, by way of the known regression line 330, to a value 267 of the wear parameter.

From the value 267 of the wear parameter, the wear information item that is characteristic of the remaining service life of the internal combustion engines can be calculated from the assignment rule, which is now known, of the regression line.

In the present case, the wear parameter is, as discussed, a thickness of a wearing layer of a bearing shell selected as engine element. In other exemplary embodiments which are not illustrated, the wear parameter is directly the remaining service life of the internal combustion engine, such that no further assignment needs to be utilized in order to estimate the wear information item.

Figure 4C:
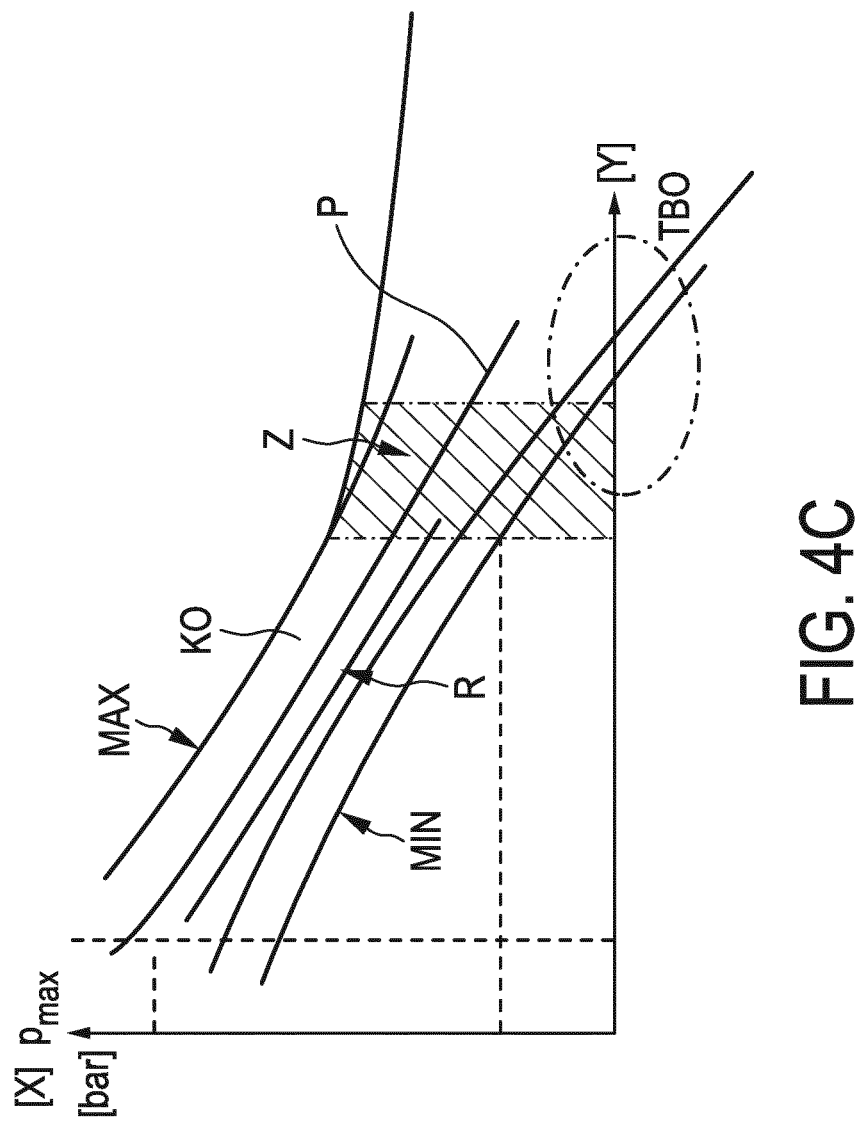
FIG. 4C shows a comparison of values from regression and prediction within a corridor of a comfort zone of minimum and maximum values.

FIG. 4C shows a comparison of values from regression R and prediction P within a corridor of a comfort zone KO of the real measured values, which is formed from minimum values MIN and maximum values MAX of the real measured values. This comparison is plotted based on the example of a TBO specification (Y) on the X axis in accordance with maximum pressure values p_max as operating parameters (X). It can be seen that, by means of the values from regression R, specifications regarding TBO specifications can be given which ultimately exhibit high reliability. Utilizing the statistical information of a corridor of the comfort zone KO, it is however also possible to give extrapolated TBO specifications which go beyond the time window of the values from regression R, without a regressive determination of a functional dependency between the number k of usage conditions X, on the one hand, and the wear parameter Y, on the other hand, being present there—the time window Z of the thus extrapolated values from prediction P is hatched in FIG. 4C and clearly expands the prediction horizon of the TBO specifications determined by means of regression R. This embodiment constitutes a considerable benefit of the concept according to the invention.

In an exemplary embodiment which is not illustrated, aside from the regression coefficients, it is also possible for an inaccuracy of the regression coefficients to be regressively calculated. From the inaccuracy, it is possible (for example analogously to FIG. 4C), in the diagrams illustrated in FIG. 4A and FIG. 4B, to additionally estimate a range within such diagrams in which the real value of the wear parameter of the internal combustion engine is particularly highly likely to lie. In this way, it is possible not only to specify the first time range of the remaining service life, as already discussed above, in which an overhaul of the internal combustion engine is merely recommended; the high likelihood can furthermore be assigned a second time range, in which an overhaul of the internal combustion engine is imperatively necessary because damage to the internal combustion engine is particularly likely. Although this embodiment thus relates to a prediction horizon which is (not expanded as in FIG. 4C, but) limited, this prediction horizon would nevertheless have to be taken into consideration with high priority.

Altogether, it is thus possible, for example, to derive TBO specifications
 which have a level of high priority; that is to say relate to a prediction horizon which is (not expanded as in FIG. 4C, but) limited, which prediction horizon would nevertheless have to be taken into consideration with high priority owing to the specifications relating to inaccuracies of the regression coefficients;
 which have a level of relatively low priority; but nevertheless relate to an expanded prediction horizon as discussed in FIG. 4C by means of extrapolated values from prediction P,
 which have a level of normal priority; that is to say relate to a reliable prediction horizon by means of values from regression R.

Figure 5:
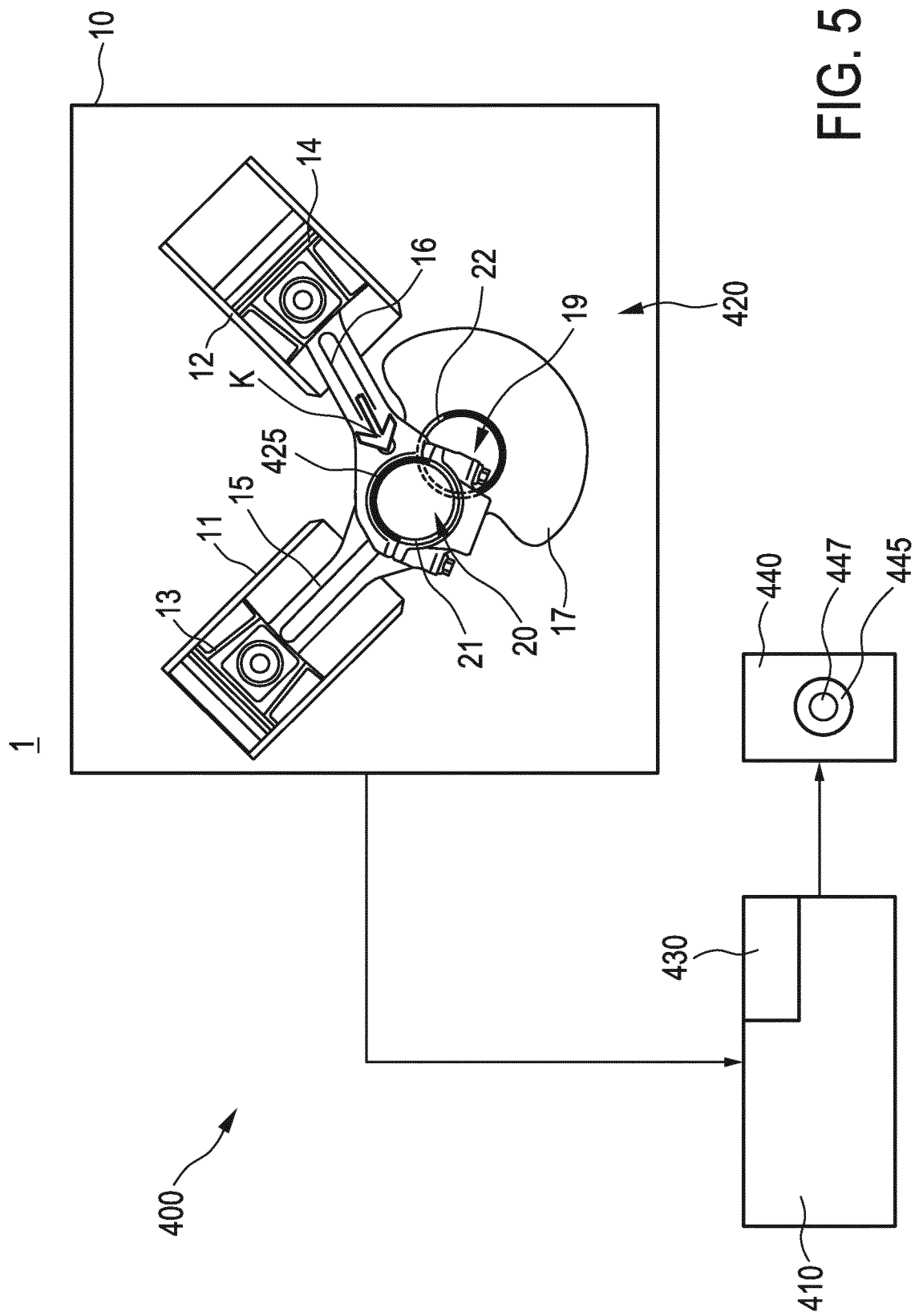
FIG. 5 is an illustration of a preferred embodiment of an internal combustion engine having a control device.

FIG. 5 schematically shows a preferred exemplary embodiment of an internal combustion engine system 400 having a control device 410 and an internal combustion engine 420, wherein the control device is designed according to the concept of the invention. In the illustrated exemplary embodiment, a bearing shell 425—reference designations 23, 24 in FIG. 1—in particular of a connecting-rod bearing 21 or main bearing 22 is selected as service-life-limiting engine element of the internal combustion engine 420—reference designation 1 in FIG. 1. The internal combustion engine 420 is electrically connected to the control device 410.

The control device 410 is designed to output a wear information item 445 estimated in accordance with the method 100 illustrated in FIG. 2, possibly with a warning signal 447. The outputting of the warning signal 447 is performed possibly by means of a visual signal, which can be perceived by a user of the internal combustion engine via a user interface 440. By means of the outputting of the wear information item 445 and/or a warning signal 447, a user of the internal combustion engine can, in the present case, be informed that the estimated remaining service life lies below a predefined threshold value for the remaining service life, such that an overhaul of the internal combustion engine should be performed soon. In the present exemplary embodiment, by way of example, the wear information item 445 and, by means of a color of the warning signal 447, an urgency of the overhaul are output. In other exemplary embodiments which are not illustrated, the warning signal is an acoustic signal or an electrical signal which is transmitted to a control unit of the plant which operates the internal combustion engine.

Furthermore, the control device 410 has a detection module 430 which is designed to automatically newly determine at least one usage condition which varies during the operation of the internal combustion engine 420 to be operated. Furthermore, the remaining service life or wear information item 445 can be newly calculated with the aid of the by means of the newly determined variable usage condition; specifically, by means of the regressively established functional dependency of the wear parameter on the usage conditions.

In the present case, by the internal combustion engine 420, firstly prior to the operation of the internal combustion engine 420, values usage conditions are determined which cannot be newly determined during the operation of the internal combustion engine 420. These include, for example, bearing width, bearing shell diameter, journal diameter, eccentricity, mean lubricating film thickness. Secondly, values for usage conditions which vary during the operation of the internal combustion engine 420 are also automatically determined at predetermined intervals during the operation of the internal combustion engine. These include for example mean degree of utilization, mean pressure, oil quality, mean piston speed, maximum ignition pressure, mean interval between past maintenance operations.

By means of the data-transmitting connection of internal combustion engine 420 and control device 410, a past service life of the internal combustion engine 420 since a most recent overhaul can be recorded. The control device 410 can subtract this past service life from a past estimation of the remaining service life in order to estimate a present value for the remaining service life. In other exemplary embodiments of the internal combustion engine system which are not illustrated, the values for the usage conditions are determined only prior to the operation of the internal combustion engine, such that the control device outputs a warning signal—in accordance with a wear information item already estimated prior to the operation of the internal combustion engine.

LIST OF REFERENCE DESIGNATIONS

1 Internal combustion engine
10 Motor block
11, 12 Cylinder
13, 14 Piston
15, 16 Connecting rod
17 Crank web
18, 19 Shaft journal
20 Crankshaft
21, 22 Connecting-rod bearing, main bearing
23, 24 Bearing shell, for example bearing half of a rod shell
25 Lubricating gap
26 Lubricating film thickness
100 Method
110, 120, 130 Method steps
140, 150, 160
170, 180
200 Illustration
210 Test internal combustion engine
220 Test engine element
225 Usage conditions
229 Test value for usage conditions
230 Wear parameter
235 Test value for wear parameter
240 Regression coefficient
250 Functional dependency
260, 420 Internal combustion engine to be operated
262 Engine element
265 Value for usage conditions
267 Value for wear parameter
270 Assignment rule
280 Remaining service life
300, 300' Assignment
310, 310' x axis
320, 320' y axis
330 Regression line
335 Pair of test values
400 Internal combustion engine system
410 Control device
425 Bearing shell
430 Detection module
440 User interface
445 Wear information item
447 Warning signal
A1 . . . A8 Cylinders 1 . . . 8 of A side
B1 . . . B8 Cylinders 1 . . . 8 of B side
EA1, EA2, EA8 Severe decreases in the running layer thicknesses at the cylinders A1, A2 and B8
K Shock force on loaded bearing halves
KO Comfort zone
R Regression
P Prediction
Z Time window
MIN Minima, envelope
MAX Maxima, envelope

The invention claimed is:

1. A method for operating an internal combustion engine with a motor, comprising a movable engine part and at least one engine element that holds said movable engine part and which is subject to wear, the method comprising the steps of:
specifying, for operation of the internal combustion engine, a service-life-limiting time interval until a next maintenance operation on the internal combustion engine, wherein the internal combustion engine comprises a number of service-life-limiting engine elements; wherein, for at least one of the service-life-limiting engine elements, a remaining service life is predicted and, from this, the service-life-limiting time interval is determined;
identifying at least one wear parameter, which tribologically determines the remaining service life of the service-life-limiting engine element, for wear of the engine element;
assigning to a number of usage conditions of the internal combustion engine respective parameter values which are operatively related to the wear of the service-life-limiting engine element;
regressively determining a functional dependency between the number of usage conditions and the wear parameter, wherein the regressive determination of the functional dependency is performed based on a predetermined operation of a number of test internal combustion engines;
calculating a value of the wear parameter for the service-life-limiting engine element of the internal combustion engine to be operated by way of the regressively determined functional dependency, and predicting a remaining service life of the service-life-limiting engine element; and,
determining the service-life-limiting time interval of the internal combustion engine to be operated from the remaining service life of the service-life-limiting engine element, wherein values which do not represent the operation of the test internal combustion engine are, as non-regressible test values, filtered out of an operation of the test internal combustion engines, wherein the values which do not represent the operation of the test internal combustion engine result from:
one-off damage to the service-life-limiting engine element,
a run-in effect of the service-life-limiting engine element,
an improper usage condition of the internal combustion engine.

2. The method according to claim 1, wherein the regressive determination of the functional dependency is performed based on: the predetermined operation of the number of test internal combustion engines, comprising in each case one test engine element, wherein, in each case, the test engine element of a test internal combustion engine corresponds to the service-life-limiting engine element of the internal combustion engine and, during the predetermined operation, the usage conditions of the test internal combustion engines are acquired; and a measurement of a test value of the wear parameter for the wear of the test engine element in each case on the test engine element of each of the number of test internal combustion engines after the predetermined operation thereof, so that the functional dependency between the measured wear parameter and the acquired usage conditions of the test internal combustion engines is specified.

3. The method according to claim 1, wherein the engine element that holds the movable engine part and which is subject to wear is an engine element which has a bearing, sealing, guiding or similar holding action and that wears relative to the movable engine part during operation and which, due to the wear, has a service-life-limiting effect for the operation of the internal combustion engine.

4. The method according to claim 1, wherein the parameter values relating to the usage conditions comprise at least one parameter of the internal combustion engine that is read out from the internal combustion engine as values, and are selected from the group comprising:
usage parameters,
operating parameters,
handling parameters,
boundary parameters.

5. The method according to claim 4, including filtering regressible test values from long-term operation of the test internal combustion engines, and determining a regressible selection of test internal combustion engines.

6. The method according to claim 5, wherein the functional dependency has regression coefficients, and the regression coefficients are regressively determined at least from
the parameter values of the usage conditions of the one or more usage parameters, operating parameters, handling parameters and/or boundary parameters of the regressible test internal combustion engines, and
the test values of the wear parameter in each case on the test engine element of each of the regressible test internal combustion engines.

7. The method according to claim 1, wherein, for the regressive determination of the functional dependency, a dependency of the wear parameter on the number of linearly independent usage conditions is predefined.

8. The method according to claim 7, including using a least squares method for the regressive determination of the functional dependency.

9. The method according to claim 1, including identifying
a wear parameter, which tribologically determines the remaining service life of the service-life-limiting engine element, for the wear of the engine element from long-term operation of the test internal combustion engines, wherein run-in effects remain disregarded, and/or
a wear parameter, which tribologically determines the remaining service life of the service-life-limiting engine element, for the wear of the engine element by a wear model of the engine element, taking into consideration geometrical effects of the service-life-limiting engine element.

10. The method according to claim 1, wherein the improper usage condition of the internal combustion engine is an improper usage parameter, operating parameter, handling parameter and/or boundary parameter of the internal combustion engine.

11. The method according to claim 1, wherein, for a multiplicity of wear parameters for the service-life-limiting engine element of the internal combustion engine to be operated, in each case one value for a wear parameter is calculated by in each case one regressively calculated functional dependency.

12. The method according to claim 1, wherein the movable engine part is selected from the group comprising:
at least one shaft of the motor,
at least one piston of the motor,
at least one shaft of a turbocharger, and
at least one shaft bearing of the shafts.

13. The method according to claim 12, wherein the at least one shaft is a crankshaft or a camshaft.

14. The method according to claim 12, wherein the at least one shaft bearing is a main bearing or connecting-rod bearing of a crankshaft of the motor, and/or a camshaft bearing of a camshaft of the motor.

15. The method according to claim 1, wherein the number of service-life-limiting engine elements is selected from a group of engine elements which hold the movable engine part and which are subject to wear, wherein the group of engine elements includes:
at least one bearing shell of a shaft bearing of the motor and/or of a turbocharger of the internal combustion engine,
at least one piston ring of at least one piston of the motor,
at least one cylinder liner of at least one cylinder of the motor,
at least one inlet valve or outlet valve of at least one cylinder of the motor, and
a bearing and seal assembly of a turbocharger.

16. The method according to claim 1, including determining a first number of test values and a second number of test values for the wear parameters of the respective test engine element at a first operating point and a second operating point, which differ from one another, of the regressible selection of internal combustion engines.

17. The method according to claim 1, wherein the usage conditions which vary during the operation of the internal combustion engine to be operated and of the regressible selection of test internal combustion engines are read out from the respective internal combustion engine as values of at least one usage condition.

18. The method according to claim 17, wherein the usage conditions are usage parameters, operating parameters, handling parameters and/or boundary parameters of the internal combustion engine.

19. The method according to claim 1, including
selecting usage parameters for a group of variables which are read out in relation to an operating point in an operating characteristic map of the internal combustion engine to be operated, the usage parameters comprising:
a mean degree of utilization of the internal combustion engine, a frequency of load alterations, use in a characteristic map region of nominal operation or outside nominal operation.

20. The method according to claim 1, including
selecting operating parameters for a group of variables which are read out in relation to a measured value of the internal combustion engine at an operating point of the internal combustion engine to be operated, the operating parameters comprising:
a maximum ignition pressure, a mean pressure in the cylinder, a mean piston speed, a power per cylinder.

21. The method according to claim 1, including
selecting handling parameters for a group of variables which are read out in relation to a value of the internal combustion engine which is held fixed for a maintenance aspect of the internal combustion engine to be operated, the handling parameters comprising:
an oil quality, oil viscosity, a mean interval between past oil changes and/or maintenance operations.

22. The method according to claim 1, including
selecting boundary parameters for a group of variables which are read out in relation to an environmental aspect of the internal combustion engine to be operated, the boundary parameters comprising:

use of the internal combustion engine at a particular geographical altitude, at particular barometric values, at particular temperature values.

23. The method according to claim 1, wherein
during the predetermined operation of the number of test internal combustion engines, the measurement of the wear parameter is performed after a predefined operating time for each of the test internal combustion engines, wherein the wear parameter comprises a wear information item which is characteristic of a service-life-limiting time interval such that a remaining service life of the internal combustion engine is specified.

24. The method according to claim 1, wherein the service-life-limiting engine element which holds the movable engine part and which is subject to wear is at least one of the group consisting of:
   a bearing shell, and the measured wear parameter is a remaining thickness of a wearing layer of the bearing shell,
   a piston ring, and the measured wear parameter is a remaining thickness of the piston ring, and
   a cylinder liner and/or is an inlet or outlet valve, and the measured wear parameter is a honing and/or an oil retention volume resulting from a surface roughness.

25. The method according to claim 1, wherein, for the movable engine part and/or at least one engine element which holds said movable engine part and which is subject to wear,
   contamination or fouling is predicted, and/or
   aging of operating media is predicted.

26. A control device of an internal combustion engine, wherein the control device is connected in communicative fashion to the internal combustion engine, wherein the control device is configured to carry out a method according to claim 1, wherein the control device is configured to output a warning signal in accordance with the estimated wear information item and is configured to automatically newly determine a value for at least one operating condition which varies during the operation of the internal combustion engine to be operated and to calculate the wear parameter using the established functional dependency.

27. An internal combustion engine having a motor, comprising:
   a movable engine part and at least one engine element that holds said movable engine part and which is subject to wear;
   a control device according to claim 26, to specify, for the operation of the internal combustion engine, a service-life-limiting time interval until a next maintenance operation on the internal combustion engine; and
   a number of service-life-limiting engine elements, wherein, for at least one service-life-limiting engine element, a remaining service life is predicted and, from this, the service-life-limiting time interval is determined.

28. The internal combustion engine according to claim 27, wherein the engine element that holds the movable engine part and is subject to wear is an engine element that has a bearing, sealing, guiding or similar holding action and that wears relative to the movable engine part during operation and that, due to the wear, has a service-life-limiting effect for the operation of the internal combustion engine.

* * * * *